C. E. PALMER.
AUTOMATIC SPEED CONTROLLER.
APPLICATION FILED AUG. 14, 1908.

924,266.

Patented June 8, 1909.

WITNESSES

INVENTOR
Charles E. Palmer
BY Munn & Co.
ATTORNEYS

UNITED STATES PATENT OFFICE.

CHARLES EDWARD PALMER, OF SPOKANE, WASHINGTON.

AUTOMATIC SPEED-CONTROLLER.

No. 924,266.  Specification of Letters Patent.  Patented June 8, 1909.

Application filed August 14, 1908. Serial No. 448,456.

*To all whom it may concern:*

Be it known that I, CHARLES E. PALMER, a subject of the King of Great Britain, and a resident of Spokane, in the county of Spokane and State of Washington, have invented a new and Improved Automatic Speed-Controller, of which the following is a full, clear, and exact description.

My invention relates to automatic speed controllers which are especially devised for use on fire escapes, but it will be understood that they may be used for various other purposes. A sprocket wheel is provided, over which a sprocket chain is disposed, the object being to control the speed of the sprocket chain automatically. The sprocket wheel is secured to a cylinder and to an internal gear wheel, which meshes with pinions, which in turn mesh with a pinion secured to a rotary piston disposed in a cylinder which contains a fluid, the cylinder and the rotary piston rotating in opposite directions when the device is operated. A valve in the cylinder is normally disposed yieldingly in a direction opposite to that of the flow of the fluid when driven by the piston, which tends to close the valve and retard the rotation of the cylinder and the piston when their speed becomes excessive. Means are also provided for regulating the means to keep the valves open.

Other objects of the invention will appear in the following more complete description of the invention.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in both figures, in which—

Figure 1:
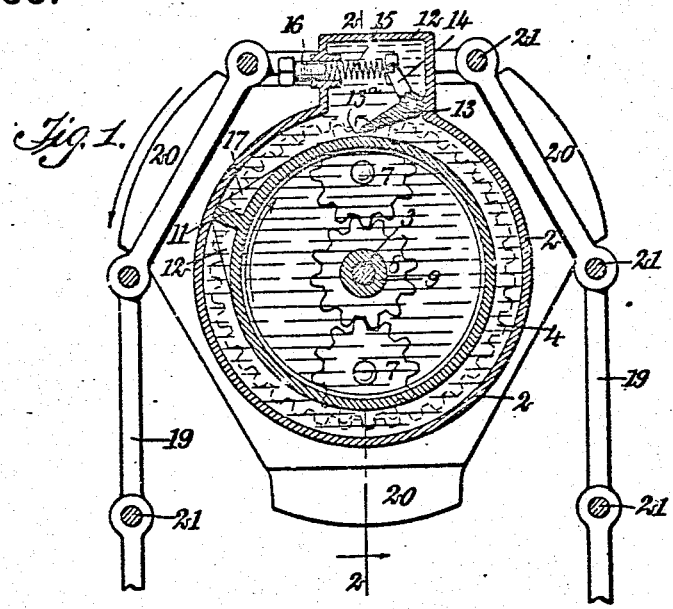
Figure 2:
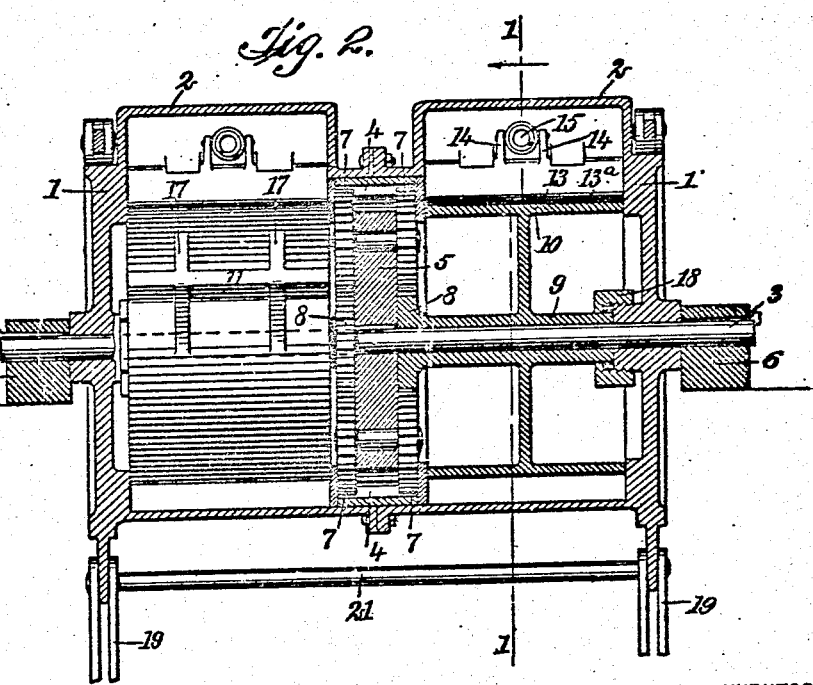

Figure 1 is a sectional view on the line 1—1 of Fig. 2; and Fig. 2 is a sectional view on the line 2—2 of Fig. 1.

By referring to the drawings, it will be seen that companion cylinders 2 are secured together and are mounted to rotate on a shaft 3, there being sprocket wheels 1 secured to the outer sides of the cylinders 2. Between the cylinders 2 and secured thereto, is disposed an internal gear wheel 4, and also in the space between the cylinders is disposed a bracket 5, which is keyed to the shaft 3. The shaft 3 is keyed to bearings 6, one at either end of the shaft. It will, therefore, be seen that neither the shaft 3, nor the bracket 5 will rotate, they being secured, as has been stated, in the bearings 6. On the bracket 5 are mounted pinions 7 which mesh with the inner gear wheel 4, and these pinions 7 mesh with pinions 8, which are secured to hollow shafts 9, mounted on the shaft 3, and to these hollow shafts 9 are secured rotary pistons 10, having projecting surfaces 11, which are adapted to rotate in close proximity to the inner surfaces of the cylinders 2. The sides of the cylinders 2 are continued inwardly until they pass the rotary pistons 10, and the space between the rotary pistons 10 and the cylinder 2, is filled with a fluid. Means may be provided for confining the fluid to this space, or, if found expedient, the cylinders 2 and the rotary pistons 10, may both be filled with the fluid. In each of the cylinders 2, there is a valve chamber 12, in which is disposed a valve 13, which is pivoted to the valve chamber. These valves 13 have arms 14, which are connected with springs 15, the springs being adapted to hold the valves 13 normally open and disposed in a direction contrary to the fluid, when driven by the projecting surfaces 11 of the rotary pistons 10. The valves also have projections 13$^a$ on the lower surfaces to prevent the complete closure of the valve under extreme pressure. Screws 16 are secured to the springs, so that the tension of the springs may be regulated to hold the valves 13 open against any desired pressure of the fluid. Inclines 17 are secured to the rotary pistons 10 and are disposed against the projecting surfaces 11, these inclines being adapted to lift the valves 13 when they are closed, or nearly closed, by the pressure of the fluid driven by the projecting surfaces 11 around the cylinders 2. Stuffing boxes 18 are provided, so that when a liquid is used in the cylinders it may be prevented from flowing out along the shaft 3. Sprocket chains 19 are disposed on sprockets 20, of the sprocket wheels 1, and these sprocket chains 19 are connected by rods 21.

When the device has been adjusted, it may remain in position for use as a means of reaching the ground in cases of fire, or for other purposes. When used as a fire escape, the person desirous of reaching the ground, may cling to the rods 21, with the assurance that the speed controller will regulate his descent, by means of the sprocket chains 19 traveling on the sprocket wheels 1, which are connected with the mechanism, as has been described, for regulating the rotation of the cylinders and the rotary pistons which are connected with the said sprocket wheels in the manner set forth.

Having thus described my invention, I claim as new and desire to secure by Letters Patent:

1. In an automatic speed controller, a cylinder which is adapted to be rotated in one direction, a rotary piston disposed in the cylinder which is adapted to be rotated in a contrary direction, means which are actuated by the cylinder and which are adapted to rotate the said rotary piston, and means which are adapted to retard the rotation of the rotary piston.

2. In an automatic speed controller, a cylinder which is adapted to be rotated in one direction, a rotary piston disposed in the cylinder which is adapted to be rotated in the contrary direction, means which are adapted to be actuated by the cylinder and which are adapted for rotating the said rotary piston, a fluid in the cylinder, and a valve which is adapted to open in a direction contrary to the normal flow of the fluid.

3. In an automatic speed controller, a cylinder which is adapted to be rotated in one direction, a rotary piston disposed in the cylinder which is adapted to be rotated in the opposite direction, means to so rotate the rotary piston, a fluid in the cylinder, a valve chamber in the cylinder, and a valve disposed in the valve chamber, the valve being normally open and disposed yieldingly in the direction contrary to the flow of the fluid when the piston is rotated in one direction.

4. In an automatic speed controller, a cylinder which is adapted to be rotated in one direction, a rotary piston disposed in the cylinder which is adapted to be rotated in the opposite direction, means to so rotate the rotary piston, a fluid in the cylinder, a valve chamber in the cylinder, a valve disposed in the valve chamber, the valve being normally open and disposed yieldingly in the direction contrary to the flow of the fluid when the piston is rotated in one direction, and means to regulate the resistance of the valve to the flow of the fluid.

5. In an automatic speed controller, a cylinder, a rotary piston disposed therein, a projecting member thereon, the said rotary piston being adapted to be rotated relatively to the cylinder, a fluid in the cylinder, a valve which is held yieldingly open and is adapted to be nearly closed against the rotary piston by the rapid flow of the fluid driven by the projecting surface, and means for lifting the valve to permit the projecting surface on the rotary piston to pass.

6. In an automatic speed controller, a cylinder, a rotary piston disposed therein, a projecting member thereon, the said rotary piston being adapted to be rotated relatively to the cylinder, a fluid in the cylinder, a valve which is held yieldingly open and is adapted to be nearly closed against the rotary piston by the rapid flow of the fluid driven by the projecting member, and means on the piston which are adapted to lift the valve to permit the projecting surface to pass.

7. In an automatic speed controller, a sprocket wheel, a cylinder and internal gear wheel secured thereto, a pinion which meshes with the internal gear wheel, a second pinion which meshes with the first pinion, a shaft for the second pinion, a rotary piston disposed within the cylinder, the shaft of the second pinion being secured to the rotary piston, and means to retard the rotation of the rotary piston as its speed increases relatively to the cylinder.

8. In an automatic speed controller, a sprocket wheel, a cylinder and an internal gear wheel secured thereto, a pinion which meshes with the internal gear wheel, a second pinion which meshes with the said pinion, a shaft secured to the second pinion, a rotary piston disposed within the cylinder, the shaft of the second pinion being secured to the rotary piston, a fluid in the cylinder, and a valve disposed yieldingly in a direction opposite to the flow of the fluid when driven by the rotation of the piston in one direction.

9. In an automatic speed controller, a shaft, a cylinder mounted to rotate thereon, a rotary piston disposed in the cylinder, a projecting member thereon, means for rotating the cylinder relative to the rotary piston, a fluid in the cylinder, a valve disposed in the cylinder which is adapted for retarding the movement of the cylinder as its speed increases, means for preventing the complete closing of the valve against the rotary piston, and an incline on the rotary piston leading to the projecting member which is adapted to lift the valve to permit the projecting member to pass.

10. In an automatic speed controller, a shaft, a cylinder mounted to rotate thereon, a rotary piston which is also mounted to rotate on the shaft, means to drive the cylinder in one direction, means to drive the rotary piston in the opposite direction, a fluid in the cylinder, a valve which is normally open and is disposed yieldingly in the direction contrary to the flow of the fluid when the piston is rotated in one direction, and means which are adapted to open said valve.

11. In an automatic speed controller, a shaft, two cylinders mounted thereon, means for rotating the cylinders, an internal gear wheel, the cylinders being supported by the internal gear wheel to which they are secured, pinions which mesh with the internal gear wheel, second pinions which mesh with the first named pinions, a rotary piston disposed in each of the cylinders, hollow shafts mounted on the said shaft, to which the rotary pistons and second pinions are secured, and means in the cylinders which are adapted to retard the rotation of the rotary pistons and cylinders relatively to each other as their speed increases.

12. In an automatic speed controller, a shaft, two cylinders mounted thereon, sprocket wheels secured to the cylinders, sprocket chains disposed on the sprocket wheels, an internal gear wheel, the cylinders being supported by the internal gear wheel to which they are secured, pinions which mesh with the internal gear wheel, second pinions which mesh with the first named pinions, a rotary piston disposed in each of the cylinders, hollow shafts mounted on the said shaft, to which the rotary pistons and second pinions are secured, a valve in each of the cylinders, the valve being disposed yieldingly in a position contrary to the flow of the fluid when the piston is rotated in one direction, and means to open the valve.

In testimony whereof I have signed my name to this specification in the presence of two subscribing witnesses.

CHARLES EDWARD PALMER.

Witnesses:
H. L. HERKEHATH,
JOSEPH LEAF.